April 23, 1968 K. LANG 3,379,900

TRISTABLE FLIP-FLOP AMPLIFIER CONTROL SYSTEM

Filed April 28, 1965 3 Sheets-Sheet 1

TRISTABLE FLIP-FLOP AMPLIFIER CONTROL SYSTEM

Filed April 28, 1965 3 Sheets-Sheet 2

United States Patent Office 3,379,900

Patented Apr. 23, 1968

3,379,900

TRISTABLE FLIP-FLOP AMPLIFIER CONTROL SYSTEM

Karl Lang, Munich, Germany, assignor to Siemens Aktiengesellschaft, Munich, Germany, a corporation of Germany Filed Apr. 28, 1965, Ser. No. 451,555

Claims priority, application Germany, Apr. 30, 1964, 590,861/64

12 Claims. (Cl. 307—296)

My invention relates to tristable flip-flop amplifier systems.

A tristable system, as a rule, serves to control an integrating action member, for example a motor, which is to remain inactive as long as a regulating error signal supplied to the tristable flip-flop remains between given positive and negative limit values +S, —S corresponding to the threshold values of the tristable flip-flop, and which is to become active, such as by running in one or the other direction, usually at constant speed, as soon as the regulating error exceeds the positive threshold value +S or the negative threshold value —S.

In most cases, the known control systems of this type, comprise two trigger circuits equipped with electronic tubes or transistors, each controlling a relay which causes the motor or other control member to be switched on for operation in one or the other direction. The requirements with respect to the amount of circuitry and components in such systems become undesirably demanding if the tristable system is to respond at relatively low input voltages, for example in the order of about 10 millivolt (mv.). This applies particularly when transistors are used as amplifier components because their emitter-base paths have threshold values of approximately 600 mv.

It is the main object of my invention to devise a purely electronic tristable flip-flop amplifier of high sensitivity of response which affords greatly reducing the above-mentioned requirements. Another object of the invention is to eliminate the need for mechanical contact switches of any kind and to preferably employ semiconductor circuit components.

A tristable flip-flop amplifying system according to the invention comprises a direct-voltage supply having a positive and a negative source terminal as well as a midtap, and is equipped with two complementary amplifier stages so connected to the direct-voltage supply means that both amplifier stages are controllable by respective voltages relative to the potential of the midtap. We further provide the circuit with a Zener diode which is connected between the input terminals of the respective two amplifier stages and which is further connected on the one hand through a resistor to one of the source terminals and, on the other hand, through the emitter-collector path of a transistor to the other source terminal, the transistor being controlled through a pre-amplifier from control-voltage supply means comprising a voltage divider connected between the respective output terminals of the two above-mentioned amplifier stages and furnishing a feedback voltage component to a stage of the pre-amplifier.

The above-mentioned direct-voltage supply is preferably formed of two equal direct-voltage sources which have respective poles of the same polarity connected with each other, the point of connection forming the midtap reference for all control voltages. One of the two amplifier stages, for example, is then controlled up to full conductance by a voltage which increases relative to the potential of the reference point, whereas the other amplifier stage is analogously controlled by a voltage decreasing relative to the reference potential. This mutually inverse control performance of the two amplifier stages is the one herein called "complementary." Preferably, the two amplifier stages comprise complementary transistors, namely an n-p-n transistor and a p-n-p transistor, whose feed voltages are taken from the poles of the direct-voltage sources and the common point of connection.

The above-mentioned objects, advantages, and features of my invention, said features being set forth with particularity in the claims annexed hereto, will be apparent from, and will be described in, the following with reference to an embodiment of a tristable flip-flop system, illustrated by way of example in the accompanying drawings, in which:

Figure 1:
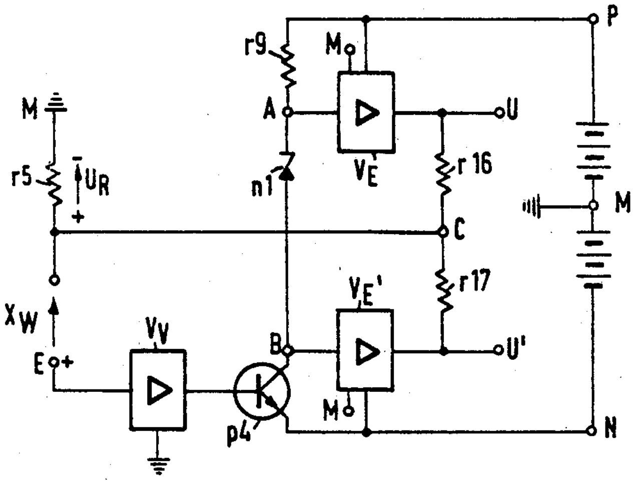
FIG. 1 is a simplified schematic diagram of an embodiment of the tristable system of the present invention.

Referring first to the schematic diagram shown in FIG. 1, there are indicated two complementary amplifiers $V_E$ and $V_E'$. In the simplest case, the amplifier $V_E$ may be constituted essentially by an n-p-n transistor plus load resistor and the amplifier $V_E'$ by a p-n-p transistor plus load resistor. Accordingly, the amplifier $V_E$ is connected between the positive pole P (for example +24 v.) and a midtap M (zero potential) of the direct-current source, and the amplifier $V_E'$ is connected between the negative pole N (for example —24 v.) and the midtap M.

The respective input terminals of the two amplifiers are denoted by A and B. They are connected with each other through a Zener diode *n*1. The input of amplifier $V_E$ is further connected through a resistor *r*9 with the positive source terminal P, and the input B of amplifier $V_E'$ is connected through the emitter-collector path of an n-p-n transistor *p*4 with the negative source terminal N. The transistor *p*4 is controlled through a pre-amplifier $V_V$ whose input terminal is denoted by E. Effective in the input circuit of the pre-amplifier is the sum or difference of an input signal voltage $X_W$ and a feedback voltage $U_R$. The feedback voltage $U_R$ is constituted by the voltage drop of a resistor *r*5 connected between the midtap terminal M of the source and the tap C of a voltage divider composed of two resistors *r*16 and *r*17 which are connected in series between the respective output terminals U and U′ of the two amplifiers $V_E$ and $V_E'$.

By selecting a suitable number of stages in the pre-amplifier $V_V$, it can be achieved that the feedback voltage $U_R$ in the input circuit of the pre-amplifier V has a positive or cumulative effect with respect to the signal voltage $X_W$. This, for example, is the case with the system represented in FIG. 1, if the respective amplifier stages $V_E$ and $V_E'$ have each a single stage, and the pre-amplifier $V_V$ has two amplifier stages, each shifting the phase of the applied signal by 180°. However, if resistor *r*9 and transistor *p*4 are exchanged with each other, the same purpose is served by a pre-amplifier with an odd number of stages because then the transistor *p*4 causes a further phase rotation of 180°.

For example, when an input voltage $X_W$ of the indicated polarity is applied and the first stage of the pre-amplifier $V_V$ is turned on, the flow of current through its second stage is reduced so that the transistor *p*4 conducts more current. This causes the potentials of respective points A and B, which differ from each other by the voltage drop of the Zener diode *n*1, to shift by the same amount toward the potential of the source terminal N. As a result, the current through the transistor of amplifier $V_E$ is reduced, and the current through the transistor of amplifier $V_E'$ is increased. Consequently, the potential of the output terminal U changes toward the potential of the source terminal P, and the potential of output terminal U′ changes toward that of source terminal M, so that the potential at point C of the voltage divider interconnecting the output terminals of the amplifiers $V_E$ and $V_E'$ becomes positive with respect to the midtap terminal M. As a result, a feedback voltage $U_R$ is now effective in the input circuit of the pre-amplifier $V_V$ in the direction indicated by an arrow in FIG. 1. Since the voltage $U_R$ has the same direction as the input signal voltage $X_W$, there results a positive feedback effect which causes the transistor *p4* to be fully turned on, whereby the potential of pulse A and B is further shifted to such an extent that the amplifier $V_E'$ is likewise fully turned on and the amplifier $V_E$ is fully turned off, as soon as the signal voltage $X_W$ reaches the threshold value +S. Accordingly, there occurs an on-signal (1-signal) at output terminal U and a zero or off-signal (0-signal) at output terminal U′. This condition remains preserved until input voltage $X_W$ again returns to a value close to zero. The flip-flop system then triggers abruptly back to its normal condition in which both output terminals U and U′ exhibit the zero signal. When the polarity of the signal voltage $X_W$ reverses and reaches a given limit value —S, the flip-flop system triggers to the other stable end condition in which the transistor *p4* and the amplifier $V_E'$ are turned off and the amplifier $V_E$ is fully turned on. The output terminal U then shows the 0-signal and the terminal U′ the 1-signal.

Figure 2:
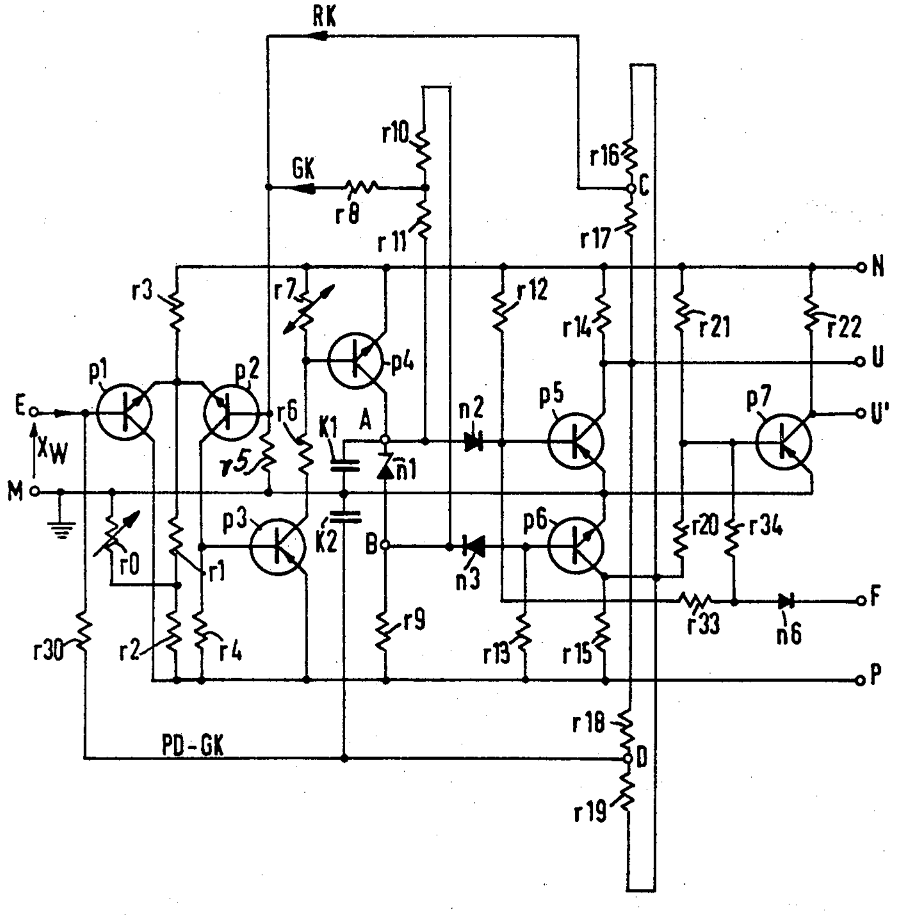
FIG. 2 is a circuit diagram of the embodiment of FIG. 1.

Relative to all essential details, the network illustrated in FIG. 2 embodies the essential features explained above with reference to FIG. 1.

According to FIG. 2, the pre-amplifier comprises three transistors *p1*, *p2* and *p3* of which the n-p-n- transistors *p1* and *p2* are coupled with each other through a common emitter resistor *r3*. This circuit connection serves in known manner to compensate the threshold values of the transistors and particularly their dependence upon temperature. For this purpose, the base of transistor *p2* is connected through a resistor *r5* with the reference terminal point M of the voltage supply source. The signal voltage $X_W$ is impressed between the base of transistor *p1* and the reference point M and thus operates through resistor *r5* to always control the two transistors *p1* and *p2* in mutually opposed sense. Connected in the collector circuit of transistor *p2* is a resistor *r4* whose voltage drop controls a p-n-p transistor *p3* which furnishes collector current for controlling the transistor *p4*, corresponding to the transistor *p4* shown in FIG. 1.

Aside from the advantages already described, the design of the input stage shown in FIG. 2 affords separating the respectively different control magnitudes. For example, the voltage tapped off the voltage divider (points C, D) at the output of the end stage amplifiers (*p5*, *p6*) may be supplied, on the one hand, to the base of transistor *p1* and, on the other hand, to the base of the transistor *p2*. Then the voltage at the input of transistor *p1* operates as a negative feedback voltage whose characteristic, for example, may be determined by RC-members. By providing the illustrated capacitor K2 and the resistor *r30*, a PD-characteristic (proportional-differential characteristic) of the regulating performance can thus be obtained.

However, the desired feedback effect can also be obtained by means of the same output voltage if this voltage, as shown in FIG. 2, is supplied to the base of the transistor *p2*. The two voltages in the illustrated embodiment are tapped off separate voltage dividers *r16*, *r17* and *r18*, *r19*. However, a single voltage divider RK may just as well be used and the two circuits may then be mutually decoupled by respective resistors.

For stabilizing the limits of response, there is provided an additional counter coupling (negative feedback coupling) leading from the input of the amplifier end stages to the base of the transistor *p2*. For this purpose, a voltage divider composed of resistors *r10* and *r11* is connected between the respective input terminals A and B of the two amplifier end stages and is connected through resistor *r8* with the base of the transistor *p2*.

A variable resistor *r0* serves to calibrate the tristable flip-flop amplifier system. With the input terminals, i.e. the connection between the base of transistor *p1* and tap point M, short-circuited, the resistor *r0* is to be so adjusted that the respective potentials of points A and B, relative to the reference point M, are equal but opposed in polarity.

Each of the two amplifier end stages comprises only one transistor *p6*, *p5*, whose respective bases are connected, through resistor circuits hereinafter described, to the differently poled terminals of the direct-voltage source so as to provide for a flow a sufficient base current to normally keep these transistors fully turned on. More specifically, the emitter-collector path of the transistor p5, which is a p-n-p transistor, is connected through a collector resistor *r14* between the poles M and N, and the base of this transistor is connected to the pole N through a resistor *r12* whose rating is such that transistor *p5*, which is a p-n-p trainsistor, is connected through a a diode *n2* with the input terminal A of transistor *p5*. Hence, the potential of the base is always constrainedly lower than the potential of the input terminal A by the amount of the threshold voltage of diode *n2*. As long as the sum of the voltage between terminals A and M plus the threshold voltage of diode *n2* is larger than the threshold value of the emitter-base path of transistor *p5*, no current can flow through the diode *n2*, so that the control condition of the transistor *p5* is exclusively determined by the base resistor *r12*. Thus, the amplifier input voltage between terminals A and M has a controlling effect only, and will then cause the transistor *p5* to be turned off, if the amount of this voltage declines to more than the threshold value of diode *n2* below the threshold value of transistor *p5*.

The other, complementary amplifier end stage is provided with the n-p-n transistor *p6* whose emitter-collector path is connected through a resistor *r15* between the source terminals P and M. The base is also connected to the terminal P through the resistor *r13* which supplies this transistor with as much base current as is needed for having this transistor fully turned on. The base of transistor *p6* is also connected through a diode *n3* with the input terminal B. In analogy to the other amplifier end stage, the voltage between source terminals P and M can have a turnoff effect upon the transistor *p6* only if this voltage is smaller by the threshold value of the diode *n3* than the threshold value of the emitter-base path of transistor *p6*.

As mentioned, the input terminals A and B of the amplifier end stages have respective equal potentials of opposed polarities as long as the amount of input signal voltage $X_W$ is smaller than the limits of response of the tristable flip-flop amplifier network. In this condition, the respective potentials of terminals A and B are determined by the Zener diode *n1* and are so set that both amplifier end stages, namely transistors *p5* and *p6*, are completely turned on. As soon as the resistance of the emitter-collector path in transistor *p4* is increased, the potential of terminal A changes toward zero and thence toward the potential of source terminal P. Simultaneously the base potential of transistor *p5* goes toward zero, so that the emitter-collector resistance of transistor *p5* increases together with the increasing emitter-collector resistance of transistor *p4*.

Such a change in the control condition of the transistor *p4* and consequently of the potential at terminal B, has no effect upon the collector current of the transistor *p6*. However, when the transistor *p4* is being controlled toward increased conductivity, the potential of terminal A goes toward that of the source terminal N and the potential of terminal B first changes toward zero and ultimately likewise toward the potential of terminal N. During this change in potential, the conductivity of transistor *p6* decreases since a gradually increasing portion of its control current is drained off through the diode $n3$, the Zener diode $n1$ and the transistor $p4$. Now, however, the transistor $p5$ remains fully turned on.

The performance of the flip-flop amplifier circuitry according to FIG. 2 corresponds entirely to that explained with reference to FIG. 1. When an input signal voltage $X_W$ is applied with the polarity indicated in FIG. 2 by an arrow, the current flowing through transistor $p1$ decreases and the current through transistor $p2$ increases. This increases the voltage drop of resistor $r4$ and consequently also the current through the transistors $p3$ and $p4$. As a result, the potential of terminal A goes toward that of terminal N and hence the terminal B potential goes toward zero. The control current for transistor $p6$, flowing through resistor $r13$, is thus partially drained off through diode $n3$, Zener diode $n1$ and transistor $p4$, so that the collector potential of transistor $p6$ changes toward the potential of terminal P. As a result, the potential of point C becomes positive with respect to the source terminal M. The feedback voltage now impressed upon the resistor $r5$ in the control circuit of the difference amplifier has the same direction as the input signal voltage $X_W$. Consequently, when $X_W$ reaches a critical limit value, the amplifier network triggers into one of the two stable switching conditions in which transistors $p4$ and $p5$ are fully turned on and transistor $p6$ is fully turned off, and the collector of transistor $p6$ is at the positive potential of source terminal P.

It is often desired that such systems operate with single-polarity signals, for example only with negative input signals. In this case, the transistor $p6$ may be followed by a reversing inversion stage equipped with the illustrated transistor $p7$ which is likewise blocked whenever transistor $p6$ is blocked.

As explained, the described tristable flip-flop amplifier system exhibits a very high sensitivity of response. This may result in an undesired control action if the amplifier system is used for regulating purposes, for example when the regulated magnitude, on account of the particular properties of the forward path of the control system, exhibits a temporary and short-lasting hunting about an average value which, as such, is still within the limits at which normally no response of the tristable system is to occur. It may be desirable to prevent such short-lasting fluctuations from resulting in a response of the regulating system equipped with such a flip-flop amplifier network. Conditions of this type occur, for example, in cases where the median output power of a radio transmitter mounted on a mast is to be kept at a constant value. In stormy weather, the impedance of the transmitter antenna varies due to swinging of the mast. The irradiated power, therefore, is subjected to short-lasting periodic fluctuations upon which the regulating system is not supposed to respond. The regulating system rather is intended to enter into operation only if the regulating error voltage $X_W$ remains larger than the response value of the regulating system for a given minimum length of time.

Figure 3:
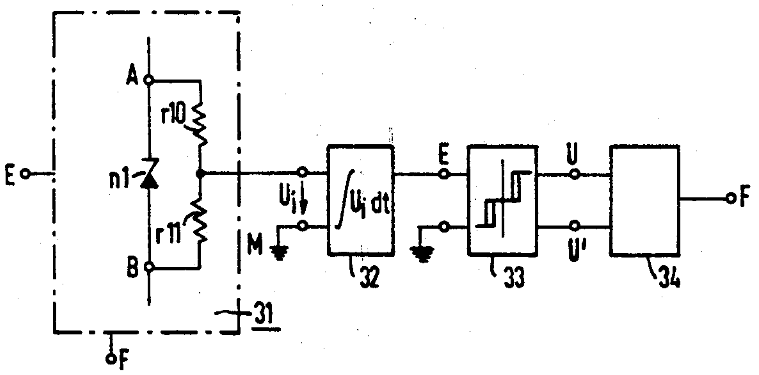
FIG. 3 illustrates part of the circuit of FIG. 2 in conjunction with accessory components.

A tristable flip-flop amplifier network according to the invention affords a relatively simple solution of this problem, as will be explained with reference to FIG. 3. Denoted by 31 is a portion of the tristable flip-flop network shown in FIG. 2 and described above, namely the voltage divider connected between the input terminals A, B of the amplifier end stages, this voltage divider consisting of the resistors $r10$ and $r11$. The voltage $U_i$ tapped off the voltage divider (relative to the potential of the midtap terminal M of the source) is supplied to an integrator or time delay stage 32 which in the simplest case is formed of a longitudinal (series) resistor and a transverse (shunt) capacitor. The output voltage of the integrator 32 is supplied to the input terminal E of another tristable flip-flop amplifier network 33 whose design may completely correspond to the one shown in FIGS. 1 and 2. The output terminals U and U' of the flop-flop amplifier 33 are connected with the two inputs of a NOR-gate 34 whose output F supplies an on-signal (1-signal) only when neither of the two input terminals U, U' supplies an on-signal (1-signal). The amplifier end stages of the tristable flip-flop amplifier 31 are blocked with the aid of this 1-signal from the output terminal F. For this purpose and as shown in FIG. 2, the base electrodes of transistors $p5$ and $p7$ are connected through respective resistors $r33$, $r34$ and a diode $n6$ to a terminal F which is identical or to be connected with the terminal F of the NOR-gate 34 shown in FIG. 3. The tristable flip-flop amplifier 31, therefore, can cause the control member (such as the above-mentioned reversible motor) to be switched on only if an off-signal (0-signal) occurs at the output terminal F.

As long as the amount of the error signal $X_W$ remains within the limits $\pm S$ of the tristable flip-flop network 31, the voltage $U_i$ is zero. If the error voltage $X_W$ becomes larger than either one of the two limit values, the flip-flop amplifier 31 will respond. The input of the integrator 32 is then impressed by the voltage $U_i$ which abruptly increases to a given value and whose polarity depends upon which of the two limits of response has been exceeded by the error signal $X_W$. Upon elapse of a given timing period, depending upon the time constant of the integrator 32, the voltage at the input E of the tristable flip-flop amplifier 33 will reach one or the other value of response, so that a 1-signal appears at one of the respective output terminals U or U' with the result that the 0-signal appears at the output F of the NOR-gate 34. As explained, the output of the flip-flop amplifier 31 and consequently the activity of the control member, such as the above-mentioned reversible motor, remains blocked as long as the output terminal F exhibits the 1-signal. This signal vanishes only when the timing period of the integrator 32 has elapsed after response of the flip-flop amplifier 31. Only then is the regulating system released, unless at this moment the regulating error $X_W$ has already returned to within the limits of response of the flip-flop network 31.

Figure 4:
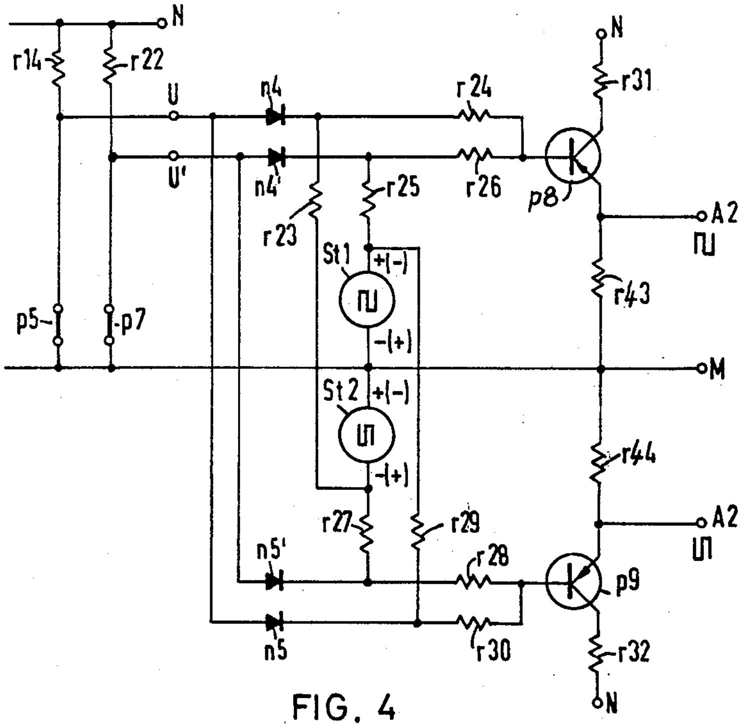
FIGS. 4 and 5 are circuit diagrams of details of the accessory components of FIG. 3.

As a rule, a tristable flip-flop amplifier system of the type described above is employed for controlling a reversible control motor. In most cases, electromagnetic relays or contactors are used whose mechanical switch contacts are connected in the excitation circuit of corresponding windings of the control motor, the relay windings being connected in the emitter-collector circuits of the transistor in the amplifier end stages. This type of system, however, is not suitable when the use of mechanical switch contacts is to be avoided in the entire system. FIG. 4, therefore, illustrates the electrical design of a control unit which receives the output voltages of the tristable flip-flop amplifier circuit and which affords an operation exclusively with solid-state components and without movable mechanical switch contacts, as well as with a minimum of circuit components.

Figure 5:
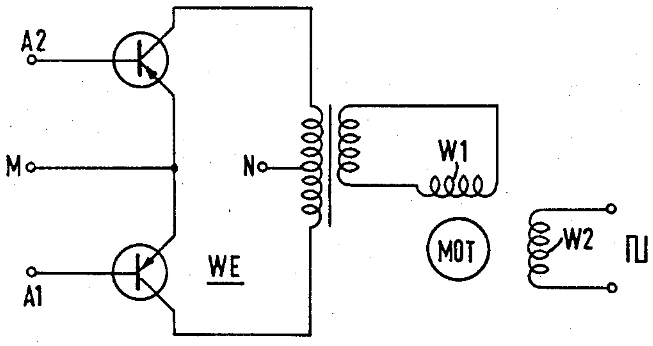

The control unit, shown in FIGS. 4 and 5 comprise an alternating-current induction motor MOT with two windings W1 and W2 spacially displaced from each other. One winding is supplied with a constant alternating voltage. The other winding receives energizing voltage 90° phase displaced from the constant voltage and supplied from an inverter WE. For controlling the electronic control components of such an inverter, whose design and function are generally known, there are usually provided two alternating voltages of rectangular wave shape 180° displaced from each other, which in general are furnished from a pre-stage of the motor control equipment.

Such pre-stages for supplying square-wave voltages are denoted by $p8$ and $p9$ in FIG. 4, each stage comprising one transistor. It should be understood that the terminals U and U' in FIG. 4 are identical or connected with the correspondingly denoted terminals in FIG. 2.

At the output terminals A1 and A2 (FIG. 4) there occur the desired square-wave control voltages which are phase displaced 180° relative to each other. Denoted by St1 and St2 are two sources of control voltages which likewise furnish respective alternating voltages of square wave shape and 180° phase displacement relative to each other. Each of these sources is connected through decoupling resistances into the control circuits of the two pre-stages and is also connected through respective decoupling diodes to the respective output terminals of the tristable flip-flop amplifier. The end portion of the flip-flop amplifier is symbolically presented in FIG. 4 by switches p5 and p7 which repersent the respective transistors p5 and p7 according to FIG. 2 and are connected, on the one hand, with the source terminal M and, on the other hand, through the collector resistors r14 and r22 with the terminal N.

As long as both electronic switches p5, p7 are closed so that the two output terminals U and U' exhibit the 0-signal, the voltages essential for the control of the pre-stages and derived from the sources St1 and St2 are virtually short-circuited so that no current can flow through the transistors p8 and p9 of the pre-stages.

However, when the electronic switch p5 is turned off, so that the terminal U exhibits the 1-signal, the diodes n4 and n5 are always blocked. Then the source St2 drives during one half wave the control current through the resistors r23, r24 and through the transistor p8, whereas the other transistor p9 is turned on in the next following half wave by a current which the source St1 drives through the resistors r29 and r30. The transistors of the two pre-stages p8 and p9 are thus alternately turned on at the frequency of the control voltages furnished from the sources St1 and St2. The inverter controlled by the pre-stages therefore furnishes an alternating voltage of a given phase position.

However, when the electronic switch p7 is opened and the electronic switch p5 is closed, so that the terminal U exhibits the 0-signal and the terminal U' the 1-signal the phase position of the voltage furnished from the inverter changes 180°. This is because now the diodes n4' and n5' are blocking, whereas a current can flow through the diodes n4 and n5. Consequently, now the correlation of the control voltage sources St1 and St2 with respect to the pre-stages p8 and p9 changes. That is, in one half wave the transistor p8 is turned on by current from the source St1 driven through the resistors r25 and r26, whereas in the next following half wave the transistor p9 is turned on by current driven from source St2 through the resistors r27 and r28.

To those skilled in the art it will be obvious upon a study of this disclosure, that my invention permits of a variety of modifications and hence may be given embodiments other than particularly illustrated and described herein, without departing from the essential features of my invention and within the scope of the claims annexed hereto.

I claim:

1. A tristable flip-flop network, comprising direct-voltage supply means having a positive and a negative source terminal and a midtap, two complementary amplifier end stages having respective input terminals and respective output terminals and having means connecting said stages to said midtap to afford controlling both stages by respective voltages relative to that of said midtap, a Zener diode connected between said respective input terminals of said two amplifier stages, a resistor connecting one of said input terminals with one of said source, terminals, a transistor havng an emitter-collector path connecting said other input terminal with said other source terminal, a pre-amplifier having an output connected to the base of said transistor for controlling said path, a voltage divider connected between said output terminals of said respective end stages, and control means connected to said pre-amplifier and comprising a tap connection at said voltage divider for controlling said pre-amplifier in dependence upon feedback voltage from said voltage divider.

2. A tristable flip-flop network, comprising direct-voltage supply means having a positive and a negative source terminal and a midtap, two complementary amplifier end stages having respective input terminals and respective output terminals and having means connecting said stages to said midtap to afford controlling said stages by respective voltages relative to that of said midtap, a Zener diode connected between said respective input terminals of said two end stages, a resistor connecting one of said input terminals with one of said source terminals, a transistor having an emitter-collector path connecting said other input terminal with said other source terminal, a pre-amplifier having input circuit means and having an output connected to the base of said transistor for controlling said path, a voltage divider connected between said output terminals of said respective end stages and having a tap, control means having signal voltage supply means connected with said input circuit means and having a positive feedback connecting said tap to said input circuit means for supplying said pre-amplifier with feedback voltage in boosting control relation to the signal voltage.

3. In a tristable flip-flop network according to claim 1, said control means comprising an auxiliary feedback loop connection between said voltage divider and said input circuit means and comprising an RC member for supplying to said pre-amplifier an auxiliary feedback voltage.

4. In a tristable flip-flop network according to claim 3, said RC member comprising longitudinal resistance means and transverse capacitance means for imparting a proportional-derivative regulating characteristic to the feedback control of the network.

5. A tristable flip-flop network according to claim 1, comprising another voltage divider connected between said respective input terminals of said two amplifier end stages and having a tap point, said pre-amplifier having a plurality of stages, and a negative feedback connection between said tap point and one of said pre-amplifier stages for applying counter-coupling voltage thereto.

6. In a tristable flip-flop network according to claim 4, said pre-amplifier comprising a first and a second stage having respective transistors coupled with each other, said two transistors having a common emitter circuit, and a coupling resistor in said emitter circuit.

7. A tristable flip-flop network according to claim 6 comprising signal voltage supply means, said two pre-amplifier transistors having respective control circuits, said signal voltage supply means being connected to said control circuit of the first one of said two transistors, said feedback voltage and said counter-coupling voltage being connected to said control circuit of said second transistor.

8. In a tristable flip-flop network according to claim 7, said respective input terminals of said two complementary amplifier end stages having normally potentials of the same magnitudes and mutually opposed polarities respectively.

9. In a tristable flip-flop network according to claim 1, each of said two complementary amplifier end stages comprising an input stage having a transistor and a resistor connecting the emitter-base path of said transistor in series between said midtap and one of said respective source terminals for normally maintaining said transistor turned on, and a diode connecting the base of said transistor with said input terminal of said amplifier end stage and being poled to block flow of current from said latter input terminal to said base.

10. A tristable flip-flop network according to claim 1, comprising another voltage divider connected between said input terminals of said respective amplifier end stages and having a tap to furnish an auxiliary voltage, an integrator having an input connected to said auxiliary voltage and having a delayed output voltage, a flip-flop circuit connected to said integrator to be controlled by said output voltage and having two outputs, a coincidence gate having two inputs connected to said two latter outputs and having a gate output, and blocking means connecting said gate output to said amplifier end stages to release the tristable network for operation when said auxiliary voltage departs from a given range for a minimum period depending upon the time delay of said integrator output voltage.

11. In a tristable flip-flop network according to claim 10, said flip-flop circuit being tristable, and said coincidence gate being a NOR-gate, whereby said tristable network is released when neither of said two outputs of said flip-flop circuit furnishes a signal to said NOR-gate.

12. A tristable flip-flop network according to claim 1, comprising a direct-current to alternating-current inverter having a control circuit responsive to a control voltage, said inverter having normally zero output voltage when said control voltage remains within given positive and negative limits and leaving one of two alternating output voltages of 180° mutual phase displacement respectively when said control voltage reaches one of said respective limits, means for supplying said control voltage comprising two pre-stages in push-pull connection with each other and having respective stage control circuits, two control voltage sources having respective square-wave voltages of 180° mutual phase displacement, de-coupling resistance means connected with each of said control voltage sources in one of said respective stage control circuits, and respective de-coupling diodes connecting said control voltage sources with said respective output terminals of the tristable flip-flop network.

No references cited.

JOHN S. HEYMAN, *Primary Examiner.*

ARTHUR GAUSS, *Examiner.*

J. D. FREW, *Assistant Examiner.*

UNITED STATES PATENT OFFICE

CERTIFICATE OF CORRECTION

Patent No. 3,379,900 April 23, 1968

Karl Lang

It is certified that error appears in the above identified patent and that said Letters Patent are hereby corrected as shown below:

In the heading to the printed specification, line 9, "590,861/64" should read -- S 90861 --.

Signed and sealed this 14th day of October 1969.

(SEAL)
Attest:

Edward M. Fletcher, Jr.
Attesting Officer

WILLIAM E. SCHUYLER, JR.
Commissioner of Patents